United States Patent
Jang et al.

(10) Patent No.: US 11,631,028 B2
(45) Date of Patent: Apr. 18, 2023

(54) METHOD OF UPDATING POLICY FOR CONTROLLING ACTION OF ROBOT AND ELECTRONIC DEVICE PERFORMING THE METHOD

(71) Applicant: Samsung Electronics Co., Ltd., Suwon-si (KR)

(72) Inventors: Jun-Won Jang, Seoul (KR); Kyung-Rock Kim, Yongin-si (KR); Taesin Ha, Seongnam-si (KR)

(73) Assignee: Samsung Electronics Co.. Ltd., Gyeonggi-do (KR)

( * ) Notice: Subject to any disclaimer, the term of this patent is extended or adjusted under 35 U.S.C. 154(b) by 606 days.

(21) Appl. No.: 16/439,994

(22) Filed: Jun. 13, 2019

(65) Prior Publication Data

US 2020/0134505 A1    Apr. 30, 2020

(30) Foreign Application Priority Data

Oct. 30, 2018    (KR) ........................ 10-2018-0131313

(51) Int. Cl.
| | |
|---|---|
| *G06N 20/00* | (2019.01) |
| *G06N 3/00* | (2006.01) |
| *B25J 9/16* | (2006.01) |
| *G05B 19/4155* | (2006.01) |
| *G06N 3/008* | (2023.01) |

(52) U.S. Cl.
CPC ............. *G06N 20/00* (2019.01); *B25J 9/163* (2013.01); *G05B 19/4155* (2013.01); *G06N 3/008* (2013.01); *G05B 2219/49065* (2013.01)

(58) Field of Classification Search
None
See application file for complete search history.

(56) References Cited

U.S. PATENT DOCUMENTS

| 8,996,177 B2 | 3/2015 | Coenen | |
| 9,008,840 B1* | 4/2015 | Ponulak | B25J 9/161 |
| | | | 700/250 |

(Continued)

FOREIGN PATENT DOCUMENTS

| CN | 107180155 A | 9/2017 |
| JP | 2015-60432 A | 3/2015 |

(Continued)

OTHER PUBLICATIONS

Author: Ying Wang, Clarence W. de Silva, Title: A machine-learning approach to multi-robot coordination Publication: Engineering Applications of Artificial Intelligence, Publisher: Elsevier Date: Apr. 2008 (Year: 2008).*

(Continued)

*Primary Examiner* — Henry Orr
(74) *Attorney, Agent, or Firm* — Harness, Dickey & Pierce, P.L.C.

(57) ABSTRACT

A tendency of an action of a robot may vary based on learning data used for training. The learning data may be generated by an agent performing an identical or similar task to a task of the robot. An apparatus and method for updating a policy for controlling an action of a robot may update the policy of the robot using a plurality of learning data sets generated by a plurality of heterogeneous agents, such that the robot may appropriately act even in an unpredicted environment.

12 Claims, 9 Drawing Sheets

(56) References Cited

U.S. PATENT DOCUMENTS

| | | | |
|---|---|---|---|
| 9,242,372 B2* | 1/2016 | Laurent | B25J 9/161 |
| 2018/0075357 A1 | 3/2018 | Subramanian et al. | |
| 2019/0232488 A1* | 8/2019 | Levine | G06N 3/08 |
| 2019/0250568 A1* | 8/2019 | Li | G06N 3/08 |
| 2021/0237266 A1* | 8/2021 | Kalashnikov | B25J 9/1697 |

FOREIGN PATENT DOCUMENTS

| | | |
|---|---|---|
| JP | 2017-215649 A | 12/2017 |
| KR | 10-1729694 | 4/2017 |
| KR | 10-1840832 | 3/2018 |

OTHER PUBLICATIONS

Lei Tai et al. "Virtual-to-real Deep Reinforcement Learning: Continuous Control of Mobile Robots for Mapless Navigation", Published in 2017 IEEE/RSJ International Conference on Intelligent Robots and Systems (IROS), Date of Conference: Sep. 24-28, 2017, Vancouver, BC, Canada; DOI: 10.1109/IROS.2017.8202134 <https://doi.org/10.1109/IROS.2017.8202134.

* cited by examiner

METHOD OF UPDATING POLICY FOR CONTROLLING ACTION OF ROBOT AND ELECTRONIC DEVICE PERFORMING THE METHOD

CROSS-REFERENCE TO RELATED APPLICATION

This application claims under 35 U.S.C. § 119 to Korean Patent Application No. 10-2018-0131313, filed on Oct. 30, 2018, in the Korean Intellectual Property Office, the entire contents of which are incorporated herein by reference in their entirety.

BACKGROUND

1. Field

At least one example embodiment relates to a method of updating a policy for controlling an action of a robot and/or an electronic device configured to perform the same. For example, at least some example embodiments relate to a method of updating a policy through reinforcement learning and/or an electronic device configured to perform the same.

2. Description of the Related Art

Generally, a robot refers to a machine that automatically processes or operates a given task according to its own capabilities. In recent years, a machine operating according to software or a chain of commands that performs a specific function and calculating a specific result is also included in the robot. For example, software or a chain of commands that collects search words from world web documents to create search indices of a website is also called a robot. As various sensors are attached to the robot, the robot is allowed to determine an environment around the robot and act in accordance with the determined environment. Specifically, an action for the determined environment may be determined based on a policy of the robot.

SUMMARY

Some example embodiments relate to a method of updating a policy associated with controlling an action of a robot.

In some example embodiment, the method includes receiving a plurality of learning datasets generated by a plurality of heterogeneous agents; generating a weighted learning database based on the plurality of learning datasets and weight sets associated with the plurality of heterogeneous agents; and updating the policy associated with controlling the action of the robot based on the weighted learning database to generate an updated policy.

In some example embodiment, a first agent of the plurality of heterogeneous agents is configured to generate a first learning dataset of the plurality of learning datasets such that the first learning dataset includes a plurality of learning data items including a current state, the action, and a reward, the current state including information on a surrounding environment of the first agent measured by the first agent, the action being performed by the first agent for the current state, and the reward being an assessment value of the action.

In some example embodiment, the plurality of learning datasets include a first learning dataset generated by a first agent of the plurality of heterogeneous agents and a second learning dataset generated by a second agent of the plurality of heterogeneous agents, and the weight sets include a first weight set associated with the first agent and a second weight set associated with the second agent. The generating the weighted learning database includes generating at least one first weighted learning data item based on the first learning dataset and the first weight set; generating at least one second weighted learning data item based on the second learning dataset and the second weight set; and generating the weighted learning database including the first weighted learning data item and the second weighted learning data item.

In some example embodiment, the generating of the first weighted learning data item includes calculating a number of data items corresponding to the first weight set for the first agent; and generating the first weighted learning data item based on the number of data items and the first learning dataset.

In some example embodiment, the updating the policy includes updating the policy such that a reward value for the action of the robot increases.

In some example embodiment, the method further includes acquiring direct learning data of the robot generated based on the updated policy; generating a direct learning database including the direct learning data; and updating the policy based on the direct learning database.

In some example embodiment, the weighted learning database includes the direct learning database such that the updating the policy based on the direct learning database includes updating the policy based on the weighted learning database.

In some example embodiment, the updating the policy based on the direct learning database includes updating the policy in response to a set number of items of the direct learning data being generated.

In some example embodiment, the updating the policy based on the direct learning database includes updating the policy in response to a reward value calculated based on the policy being greater than or equal to a set value.

In some example embodiment, the acquiring the direct learning data of the robot based on the updated policy includes generating a current state of the robot using at least one sensor associated with the robot; controlling the action of the robot using the updated policy; calculating a reward for the action of the robot; and generating the direct learning data including the current state of the robot, the action of the robot, and the reward for the action of the robot.

Other example embodiments relate to a non-transitory computer-readable medium including computer readable instructions that, when executed by a computer, cause the computer to perform a method of updating a policy associated with controlling an action of a robot Other example embodiments relate to an electronic device configured to update a policy associated with controlling an action of a robot.

In some example embodiments, the electronic device includes a memory configured to store a program for updating the action of the robot; and a processor configured to execute the program to, receive a plurality of learning datasets generated by a plurality of heterogeneous agents, generate a weighted learning database based on the plurality of learning datasets and weight sets associated with the plurality of heterogeneous agents, acquire direct learning data of the robot generated based on the weighted learning database and the policy associated with controlling the action of the robot, and update the policy based on at least the direct learning data.

In some example embodiments, the processor is configured to update the policy by updating the policy in response to a set number of items of the direct learning data being generated.

In some example embodiments, the processor is configured to update the policy by updating the policy in response to a reward value calculated based on the policy being greater than or equal to a set value.

In some example embodiments, the processor is configured to update the policy by updating the policy such that a reward value for the action of the robot increases.

In some example embodiments, the processor is configured to acquire the direct learning data by, generating a current state of the robot using at least one sensor associated with the robot, controlling the action of the robot using the policy, calculating a reward for the action of the robot, and generating the direct learning data including the current state, the action, and the reward for the action of the robot Other example embodiments may relate to a robot that includes an electronic device configured to update a policy associated with controlling an action of a robot.

Other example embodiments relate to a method of updating a policy associated with controlling an action of a robot.

In some example embodiments, the method includes receiving a plurality of learning datasets generated by a plurality of heterogeneous agents; generating a weighted learning database based on the plurality of learning datasets and weight sets associated with the plurality of heterogeneous agents; acquiring direct learning data of the robot generated based on the weighted learning database and the policy associated with controlling the action of the robot; and updating the policy based on at least the direct learning data.

In some example embodiments, the updating of the policy based on the direct learning data includes updating the policy based on the weighted learning database and the direct learning data.

In some example embodiments, the acquiring of the direct learning data includes generating a current state of the robot using at least one sensor associated with the robot; controlling the action of the robot using the policy; calculating a reward for the action of the robot; and generating the direct learning data including the current state, the action, and the reward for the action of the robot.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1:
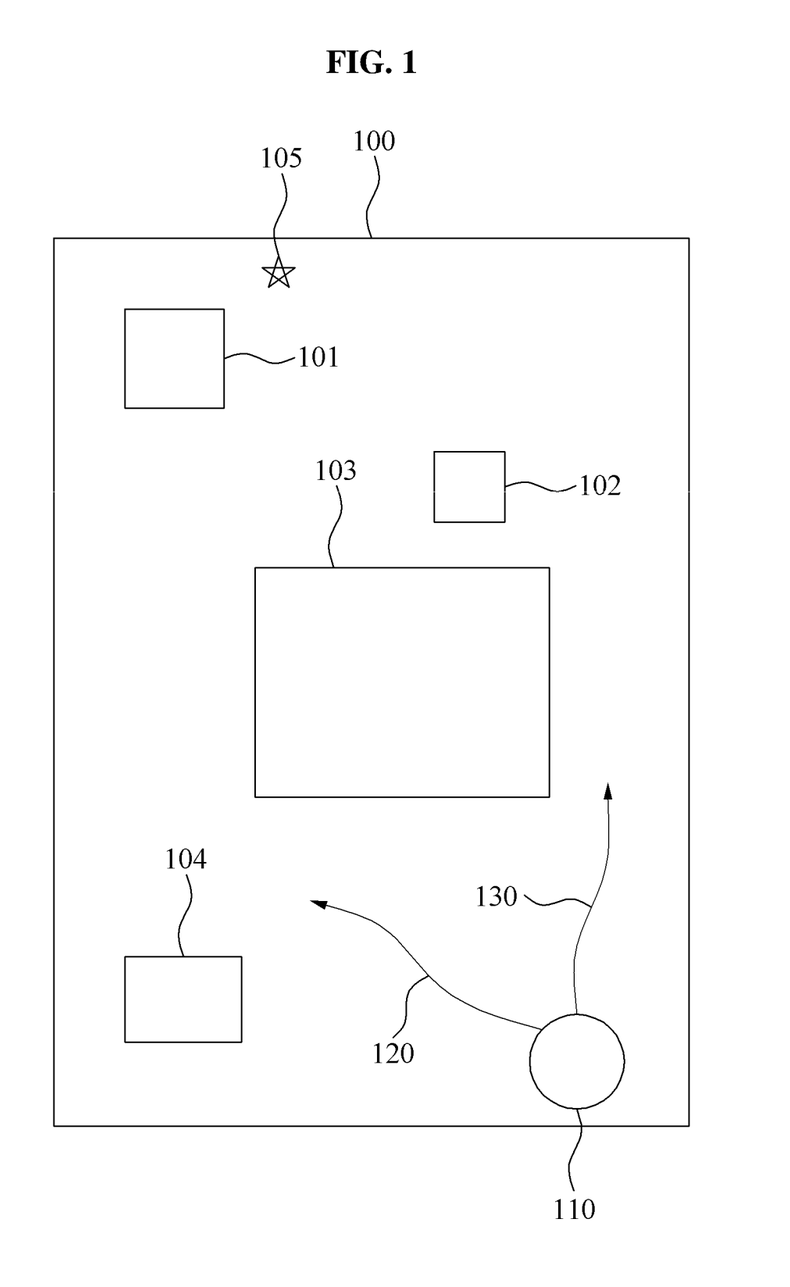
FIG. 1 illustrates an action of a robot for achieving a final goal according to at least one example embodiment.

FIG. 1 illustrates an action of a robot for achieving a final goal according to at least one example embodiment.

In order for a robot to automatically process a given task, a policy for controlling an action of the robot may be utilized. For example, an action of a robot may be a mechanical movement, and as another example, may be an execution of a desired (or, alternatively, a predetermined) program or software. However, the action of the robot is not limited to examples described herein. The action of the robot may be an output of the robot generated in response to an input.

In one example, a robot may be a service robot. The service robot may be a robot that provides information or a service to a user. The service robot may guide the user to a desired (or, alternatively, a predetermined) position or follow the user. The service robot may be, for example, a guide robot, a robot that carries goods, a cart robot in a supermarket, or an autonomous vehicle. The service robot may also be a robot that performs a function of washing dishes or cleaning a desired (or alternatively, a predetermined) area.

In another example, a robot may be a social robot. The social robot may understand an action of a user through a voice, a body language, a facial expression, and the like of the user and provide a reaction corresponding to the action to the user.

In another example, a robot may be a robot arm.

In another example, a robot may be a robot that performs combinations of the aforementioned functions. For example, the social robot may additionally perform the function of the service robot.

Referring to FIG. 1, a robot 110 may perform a task for moving to a destination 105. A policy of the robot 110 may be for controlling an action of the robot 110 to move the robot 110 from a current position of the robot 110 to the destination 105. Since an obstacle 103 may be located on a straight distance from the current position of the robot 110 to the destination 105, a path that bypasses the obstacle 103 may be generated. Since obstacles 101, 102, and 104 are located around the robot 110 in addition to the obstacle 103, the obstacles 101, 102, and 104 may also be considered for path generation. For example, as candidate paths, a first candidate path 120 starting in a left direction of the robot 110 and a second candidate path 130 starting in a right direction of the robot 110 may be considered. The more precise the policy for controlling the robot 110 is, the more accurately the task may be processed. The policy may become more precise through a training.

When a current state of a robot 110 is an input and an action of the robot 110 is an output, a policy may be an algorithm for generating the output using the input. For example, the algorithm may include a plurality of network layers connected through nodes. The algorithm may be constructed using a neural network including the plurality of network layers, but example embodiments are not be limited thereto.

When the policy is the algorithm, a training of the policy may have the same meaning as updating the algorithm. The update of the algorithm may be to adjust a connection relationship of the plurality of network layers. For example, the algorithm may be updated by changing weights of nodes connecting the plurality of network layers.

Learning data may be used for updating the policy. The learning data may be data generated by an agent which has performed an identical or similar task to that of the robot 110 in advance. The agent may include, but not be limited to, a robot differing from the robot 110 and performing the same task as the robot 110, a motion planner, human demonstration or teaching, human direct command, computer simulation, a human robot interface (HRI)-based robot in a virtual environment, and a machine robot interface (MRI)-based robot in a virtual environment. The agent may perform an identical or similar task to that of the robot 110 and refer to any method and means by which data calculated in a process of performing the task is to be recorded.

For example, an agent may be the human demonstration or teaching. In this example, when a position sensor and an acceleration sensor are attached to a person, values of the sensors obtained by performing a task may be learning data. As another example in which an agent is the human demonstration or teaching, a case in which a person directly moves a robot may also be considered. In this example, values of sensors of a robot that has measured a motion made by the person may be learning data. In the above case, even though the robot generates the learning data, the agent may correspond to the human demonstration or teaching because the person causes an action of the robot. The policy of the robot 110 may be updated using the learning data acquired from the agent.

A method of updating a policy for controlling an action of a robot will be described in detail with reference to FIGS. 2 through 9.

Figure 2:
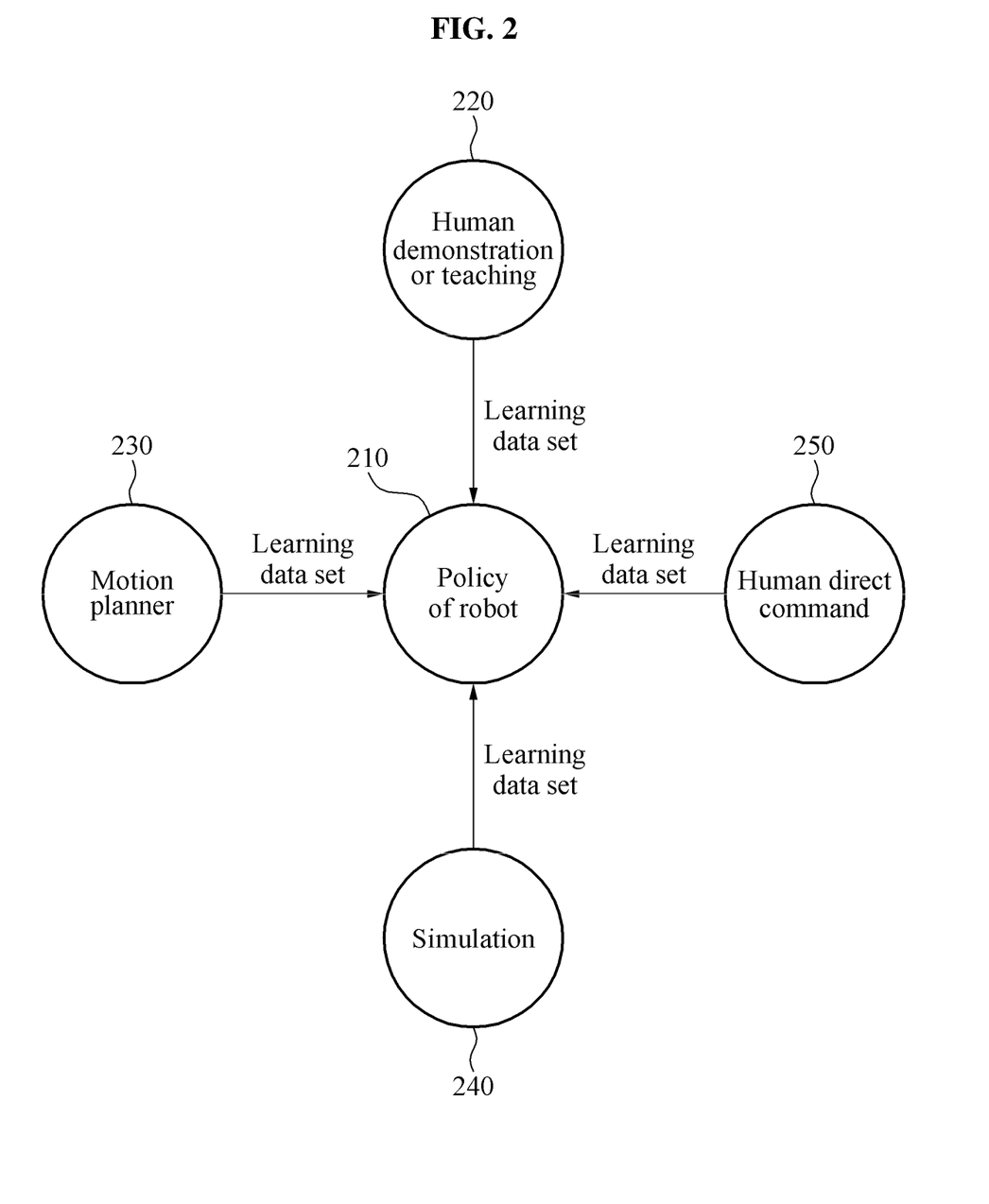
FIG. 2 illustrates a plurality of learning data sets generated by a plurality of heterogeneous agents used for updating a policy of a robot according to at least one example embodiment.

FIG. 2 illustrates a plurality of learning data sets generated by a plurality of heterogeneous agents used for updating a policy of a robot according to at least one example embodiment.

Referring to FIG. 2, to train a robot or update a policy 210 of the robot, simulation-based training may be performed instead of training in a real environment. The simulation-based training may reduce (or, alternatively, prevent) damage to the robot. Also, in simulation-based training, a large amount of training may be performed in a short period of time. However, since a simulation environment is not the same as the real environment, the robot trained through simulation may not appropriately operate in the real environment. Thus, the robot may also be trained in the real environment. The training of the robot in the real environment may be performed through a few trials in a short period of time. In order to train the robot in the real environment, high quality learning data may need to be provided. In the high quality learning data, data on a good trial for solving the task may be clearly distinguished from data on a bad trial for solving the task. Also, a generating source of the high quality learning data may not biased toward a particular agent.

When learning data of a desired (or, alternatively, a predetermined) agent is used to train the robot or update the policy 210 of the robot, an action of the robot may be similar to an action of the agent. For example, the agent may be one of a first agent 220 corresponding to human demonstration or teaching, a second agent 230 corresponding to a motion planner that performs motion planning, a third agent 240 corresponding to computer simulation, or a fourth agent 250 corresponding to a method of directly controlling the robot using a controller such as a joystick.

When the robot is trained using learning data generated by the first agent 220 corresponding to the to human demonstration or teaching, the robot may make action similar to an action of a person. For a task for location movement, a person may choose a path by taking into account not only a shortest distance but also a social aspect not to disturb others. When the robot is trained using learning data generated by the second agent 230 corresponding to the motion planner, the robot may make action similar to an action of the motion planner. For a task for location movement, the motion planner may choose a path with the shortest distance. When the robot is trained learning data generated by the fourth agent 250 corresponding to the human direct command, the robot may make action similar to an action instructed by the human direct command. As such, a tendency of an action of the robot may vary based on a generating source of learning data used for training the robot. Also, when each of a plurality of people directs an action of the robot, different agents may correspond to the plurality of people.

When the robot is trained using learning data generated by a single desired (or, alternatively, a predetermined) agent, the robot may not appropriately operate in an untrained situation.

To avoid (or, alternatively, prevent) such situation, in one or more example embodiments, a variety of learning data generated by heterogeneous agents may be used for training of the robot. For the same or similar task, a variety of learning data generated by the heterogeneous agents may represent different actions, so that the robot may act appropriately for various situations.

Proportions of the learning data generated by the heterogeneous agents may be adjusted based on an intention of the training. For example, when the action of the robot is to be controlled similarly to an action of a person, a proportion of the learning data generated by the first agent 220 may be adjusted to be greater than proportions of the learning data generated by the second agent 230, the third agent 240, and the fourth agent 250.

A method of updating a policy for controlling an action of a robot will be described in detail with reference to FIGS. 3 through 9.

Figure 3:
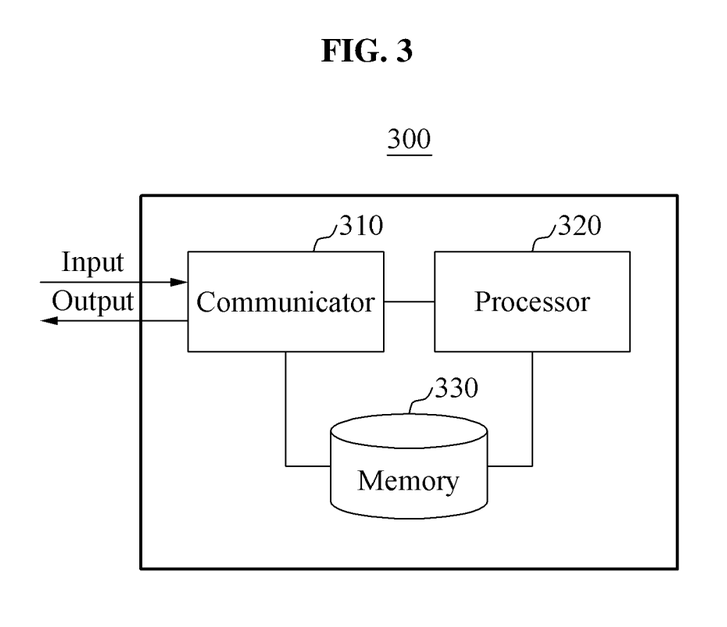
FIG. 3 is a block diagram illustrating an electronic device for updating a policy for controlling an action of a robot according to at least one example embodiment.

FIG. 3 is a block diagram illustrating an electronic device for updating a policy for controlling an action of a robot according to at least one example embodiment.

Referring to FIG. 3, an electronic device 300 may include a communicator 310, a processor 320, and a memory 330. The communicator 310 may be connected to the processor 320 and the memory 330 to perform data transmission and reception. Also, the communicator 310 may be connected to an external device to perform data transmission and reception. In the following description, an expression "transmitting and receiving 'A'" refers to transmitting and receiving data or information representing "A".

The communicator 310 may be implemented as, for example, a circuitry in the electronic device 300. In an example, the communicator 310 may include an internal bus and an external bus. In another example, the communicator 310 may be an element configured to connect the electronic device 300 to an external device. The communicator 310 may be, for example, an interface. The communicator 310 may receive data from the external device and transmit data to the processor 320 and the memory 330.

The processor 320 may process data received by the communicator 310 and data stored in the memory 330. The term "processor," as used herein, may be a hardware-implemented data processing device having a circuit that is physically structured to execute desired operations. For example, the desired operations may include code or instructions included in a program. The hardware-implemented data processing device may include, but is not limited to, for example, a microprocessor, a central processing unit (CPU), a processor core, a multi-core processor, a multiprocessor, an application-specific integrated circuit (ASIC), and a field-programmable gate array (FPGA).

The processor 320 may execute a computer-readable code (for example, software) stored in a memory (for example, the memory 330), and execute instructions caused by the processor 320.

Figure 4:
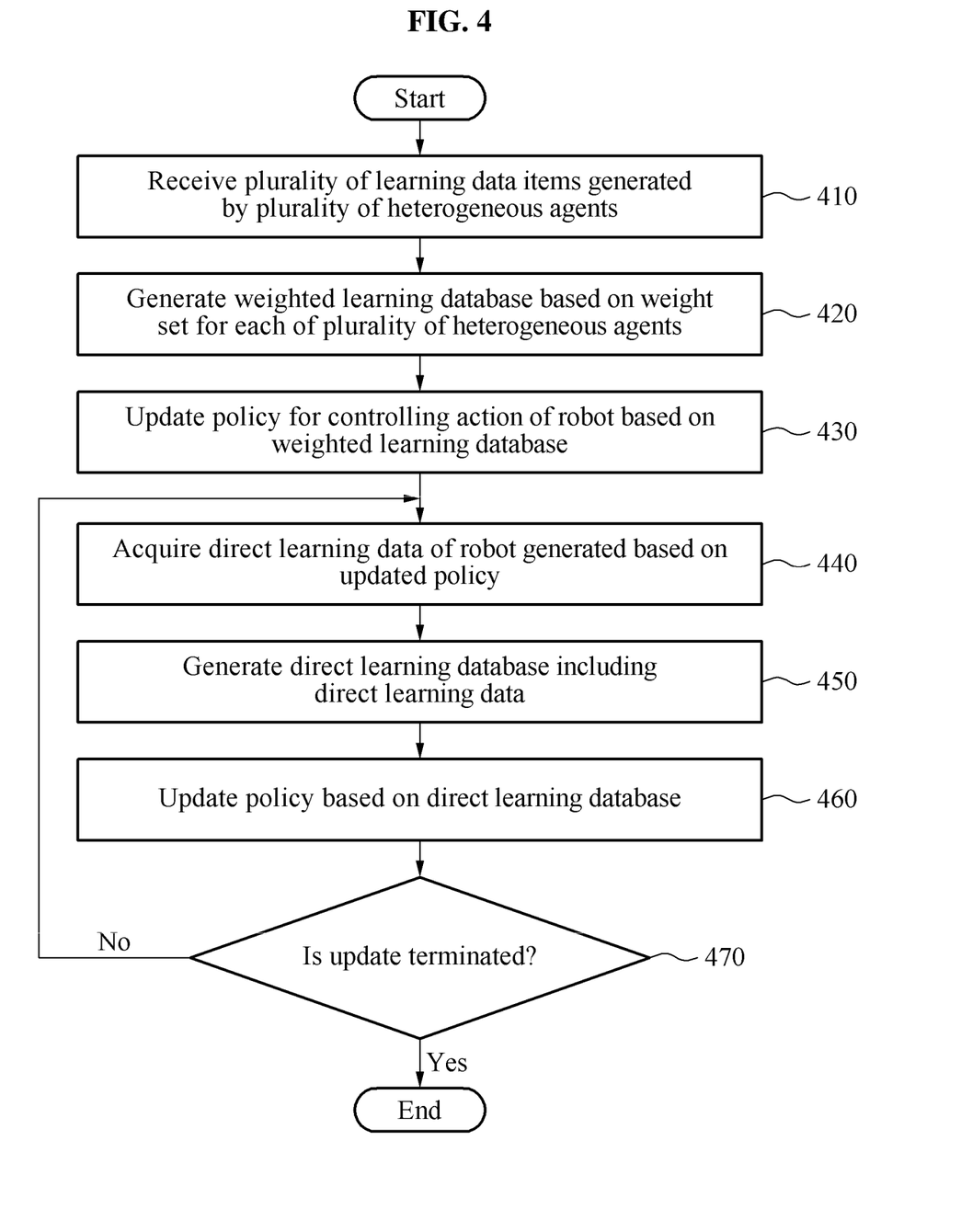
FIG. 4 is a flowchart illustrating a method of updating a policy for controlling an action of a robot according to at least one example embodiment.
Figure 9:
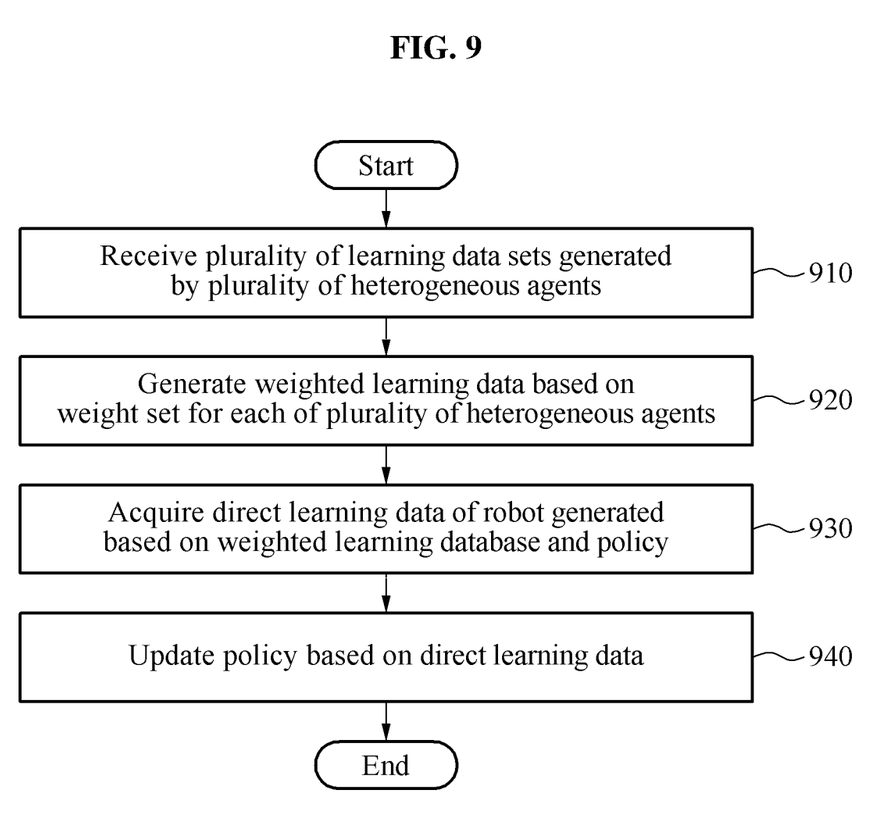
FIG. 9 is a flowchart illustrating a method of updating a policy based on a direct learning database according to at least one example embodiment.

For example, the processor 320 may execute the computer-readable codes such that the processor 320 is transformed into a special purpose processor to perform the method of updating a policy for controlling an action of the robot 110 of FIG. 4 and/or the method of updating a policy for controlling an action of the robot 110 based on a direct learning database of FIG. 9. Therefore, the processor 320 may improve the functioning of the robot 110 itself by utilizing a variety of learning data generated by heterogeneous agents so that the robot may act appropriately for various situations.

The memory 330 may store data received by the communicator 310 and data processed by the processor 320. For example, the memory 330 may store a program. The stored program may be a set of syntaxes executable by the processor 320 and coded to control an action of a robot.

The memory 330 may include, for example, at least one volatile memory, a nonvolatile memory, a random access memory (RAM), a flash memory, a hard disk drive and an optical disc drive.

The memory 330 may store an instruction set (for example, software) to the electronic device 300. The instruction set to operate the electronic device 300 may be executed by the processor 320.

The communicator 310, the processor 320, and the memory 330 will be further described with reference to FIGS. 4 through 9.

FIG. 4 is a flowchart illustrating a method of updating a policy for controlling an action of a robot according to at least one example embodiment.

Operations 410 through 460 may be performed by the electronic device 300 of FIG. 3.

In operation 410, the electronic device 300 receives a plurality of learning data items or a plurality of learning data sets generated by a plurality of heterogeneous agents. For example, the plurality of heterogeneous agents may include at least two of the first agent 220, the second agent 230, the third agent 240, and the fourth agent 250 of FIG. 2. Each of the first agent 220, the second agent 230, the third agent 240, and the fourth agent 250 may perform a task and generate learning data.

The learning data may include a current state s of an agent, an action a of the agent in the current state s, and a reward r for the action a of the agent. In addition, the learning data may further include a next state s' due to the action a of the agent.

The current state s may be represented as values measured by at least one sensor of the agent. The current state s may be information on a surrounding environment of the agent measured by the agent. The current state s may include, for example, an image generated by a camera, a radar map generated by a radar, an acceleration value generated by an inertial measurement unit (IMU), an angular velocity of a motor and/or an angular acceleration of a motor. Also, secondary values analyzed using the aforementioned primary values may be included in the current state s. For example, information on an object detected from the image generated by the camera may be included in the current state s as a secondary value.

The action a of the agent may represent how the agent acted or operated with respect to the current state s. For example, when the current state s is that an obstacle is present in front of the agent, and when the agent has turned to the left, the action a of the agent may be an operation of turning to the left or values measured by at least one sensor of the agent while the agent is turning to the left.

The reward r may be an assessment value of the action a. The reward r may represent how well the task has progressed due to the action a. For example, when the task is a movement to a desired (or, alternatively, a predetermined) destination, how much a distance to the destination has been reduced may be the reward r.

The next state s' may be subsequent to the current state s and measured by the action a. The next state s' may be represented as values measured by at least one sensor of the agent.

Learning data items generated by the same agent may be configured into a learning data set. For example, a plurality of learning data items generated by the first agent 220 may be referred to as a first learning data set.

In operation 420, the electronic device 300 generates a weighted learning database based on a weight set for each of the plurality of heterogeneous agents and the plurality of learning data sets. When the robot is to act similar to an action of a person, a first weight for the first agent 220 may be set to be greater than weights for other agents, for example, the second agent 230, the third agent 240, and the fourth agent 250. Even in a case in which the first weight is greater than other weights, if the other weights are not zero, learning data items of agents of which weights are not zero may be applied to training of the robot. Such training method may allow the robot to cope with various situations. A method of generating the weighted learning database will be further described with reference to FIGS. 5 and 6.

In operation 430, the electronic device 300 updates a policy for controlling an action of the robot based on the weighted learning database. For example, the policy may be updated such that a reward value for the action of the robot is increased (or, alternatively, maximized). When the policy is an algorithm, the policy may be updated by adjusting a connection relationship of a plurality of layers included in the algorithm.

The update of the policy performed in operation 430 may not be an update performed using data actually generated by the robot and thus, may be referred to as "pre-training". Depending on an example, operation 430 may not be performed.

In operation 440, the electronic device 300 acquires direct learning data of the robot based on the updated policy. The direct learning data may be data acquired while the robot is actually performing the task. In order to contrast the term "direct learning data", the learning data generated by the first agent 220, the second agent 230, the third agent 240, and the fourth agent 250 may be understood as indirect learning data.

When operation 430 is not performed, direct learning data of the robot may be acquired based on a non-updated policy and the weighted learning database. The non-updated policy may be a default policy.

When the electronic device 300 is not included in the robot, the electronic device 300 may directly receive the direct learning data. When the electronic device 300 is included in the robot, the electronic device 300 may generate direct learning data using the robot. A method in which the electronic device 300 directly generates the direct learning data will be further described with reference to FIG. 7.

In operation 450, the electronic device 300 generates a direct learning database including the direct learning data. In one example, the direct learning database may be included in the weighted learning database. In another example, the direct learning database may be generated separately from the weighted learning database.

In operation 460, the electronic device 300 updates the policy based on the direct learning database. Since the policy is updated using the direct learning data, data acquired while the robot is actually performing the task may be applied to the policy. The direct learning data may include the current state s, the action a, and the next state s' of the robot. The electronic device 300 may update the policy such that a value of the reward r for the action a of the robot is maximized. The above policy updating method may be a reinforcement learning-based method. Reinforcement learning may be performed on-line.

When the weighted learning database includes the direct learning database, the electronic device 300 may update the policy based on the weighted learning database.

A method of updating the policy based on the direct learning database will be further described with reference to FIG. 8.

In operation 470, the electronic device 300 determines whether the update of the policy is terminated. When it is determined that the update of the policy is not terminated, operation 440 may be performed.

Figure 5:
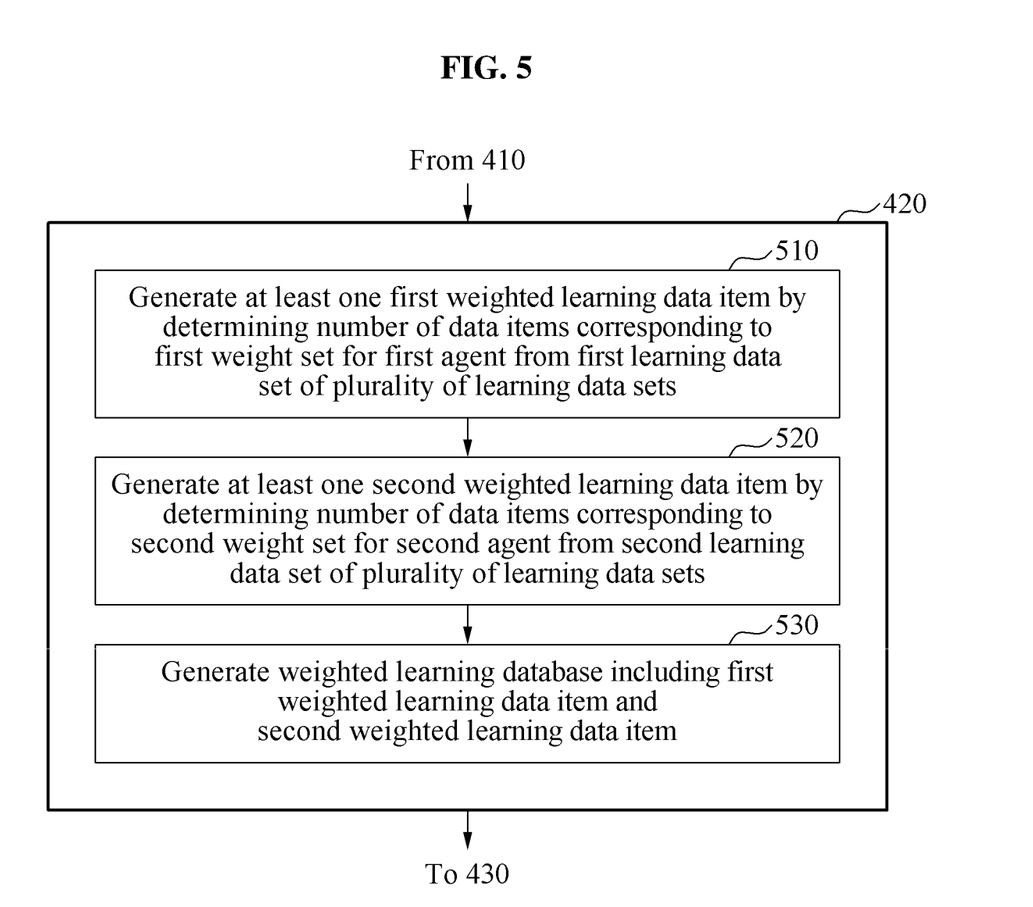
FIG. 5 is a flowchart illustrating a method of generating a weighted learning database according to at least one example embodiment.

FIG. 5 is a flowchart illustrating a method of generating a weighted learning database according to at least one example embodiment.

Operation 420 of FIG. 4 includes operations 510 through 530 as described below.

In operation 510, the electronic device 300 generates at least one first weighted learning data item by determining a number of data items corresponding to a first weight set for the first agent 220 from a first learning data set of the plurality of learning data sets. The first learning data set may be generated by the first agent 220.

In operation 520, the electronic device 300 generates at least one second weighted learning data item by determining a number of data items corresponding to a second weight set for the second agent 230 from a second learning data set of the plurality of learning data sets. The second learning data set may be generated by the second agent 230. The first agent 220 and the second agent 230 may be different from each other.

Although the first weighted learning data item and the second weighted learning data item are described through operations 510 and 520, the description of operations 510 and 520 may be similarly applied to an $n^{th}$ weighted learning data item.

In operation 530, the electronic device 300 generates a weighted learning database including the first weighted learning data item and the second weighted learning data item.

Figure 6:
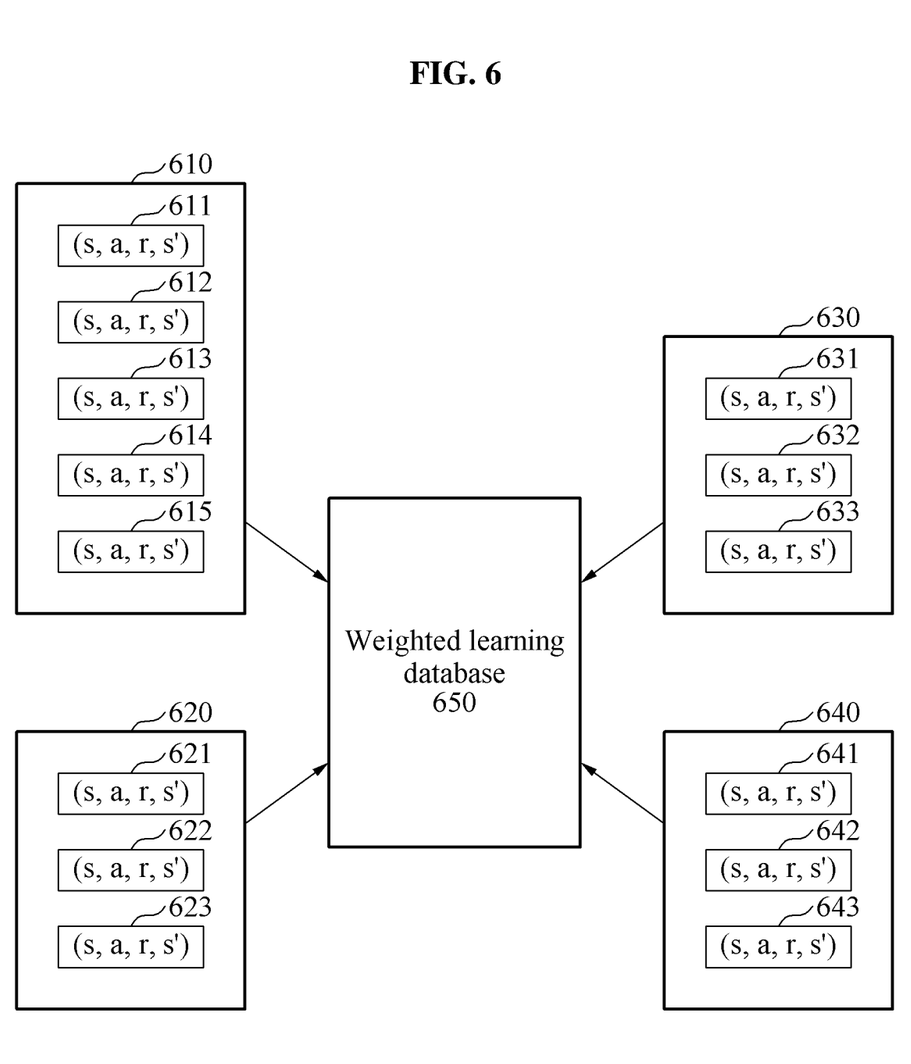
FIG. 6 illustrates a plurality of learning data items and a weighted learning database according to at least one example embodiment.

FIG. 6 illustrates a plurality of learning data items and a weighted learning database according to at least one example embodiment.

Learning data items 611 through 615 may be generated by the first agent 220. The learning data items 611 through 615 may be configured into a first learning data set 610. Although each of the learning data items 611 through 615 is indicated as (s, a, r, s'), (s, a, r, s') of each of the learning data items 611 through 615 may be the same or different from one another. Learning data items 621 through 623 may be generated by the second agent 230. The learning data items 621 through 623 may be configured into a second learning data set 620. Learning data items 631 through 633 may be generated by the third agent 240. The learning data items 631 through 633 may be configured into a third learning data set 630. Learning data items 641 through 643 may be generated by the fourth agent 250. The learning data items 641 through 643 may be configured into a fourth learning data set 640. The electronic device 300 receives a plurality of learning data sets, for example, the first learning data set 610 through the fourth learning data set 640 from a plurality of agents, for example, the first agent 220 through the fourth agent 250.

A weight may be set for each of the plurality of agents 220 through 250 for a tendency represented by an action of a robot. When the action of the robot is to be controlled similar to an action of a person, a first weight for the first agent 220 may be adjusted to be greater than weights of other agents, for example, the second agent 230 through the fourth agent 250. For example, the first weight may be set as 0.7, a second weight may be set as 0.1, a third weight may be set as 0.1, and a fourth weight may be set as 0.1.

The electronic device 300 may generate a weighted learning database to be used for training of the robot based on the weights. The electronic device 300 may calculate a number of data items corresponding to the weight set for each of the plurality of agents 220 through 250. For example, when the weighted learning database includes 1000 data items, the first weight is set as 0.7, the second weight is set as 0.1, the third weight is set as 0.1, and the fourth weight is set as 0.1, a number of data items corresponding to the first weight may be calculated to be 700, a number of data items corresponding to the second weight may be calculated to be 100, a number of data items corresponding to the third weight may be calculated to be 100, and a number of data items corresponding to the fourth weight may be calculated to be 100.

The electronic device 300 may generate first weighted learning data or a first weighted learning data set by randomly determining the calculated number of data items, for example, 700 from the first learning data set 610. For example, when the first learning data set 610 includes 300 learning data items, the electronic device 300 may randomly determine one of the 300 learning data items and repeat the determining 700 times, thereby generating the first weighted learning data. The description of the process for generating the first weighted learning data may be similarly applied to the process of generating second weighted learning data, third weighted learning data, and fourth weighted learning data.

For example, a weighted learning database 650 may include the first weighted learning data including 700 learning data items, the second weighted learning data including 100 learning data items 100, the third weighted learning data including 100 learning data items 100, and the fourth weighted learning data including 100 learning data items 100.

Figure 7:
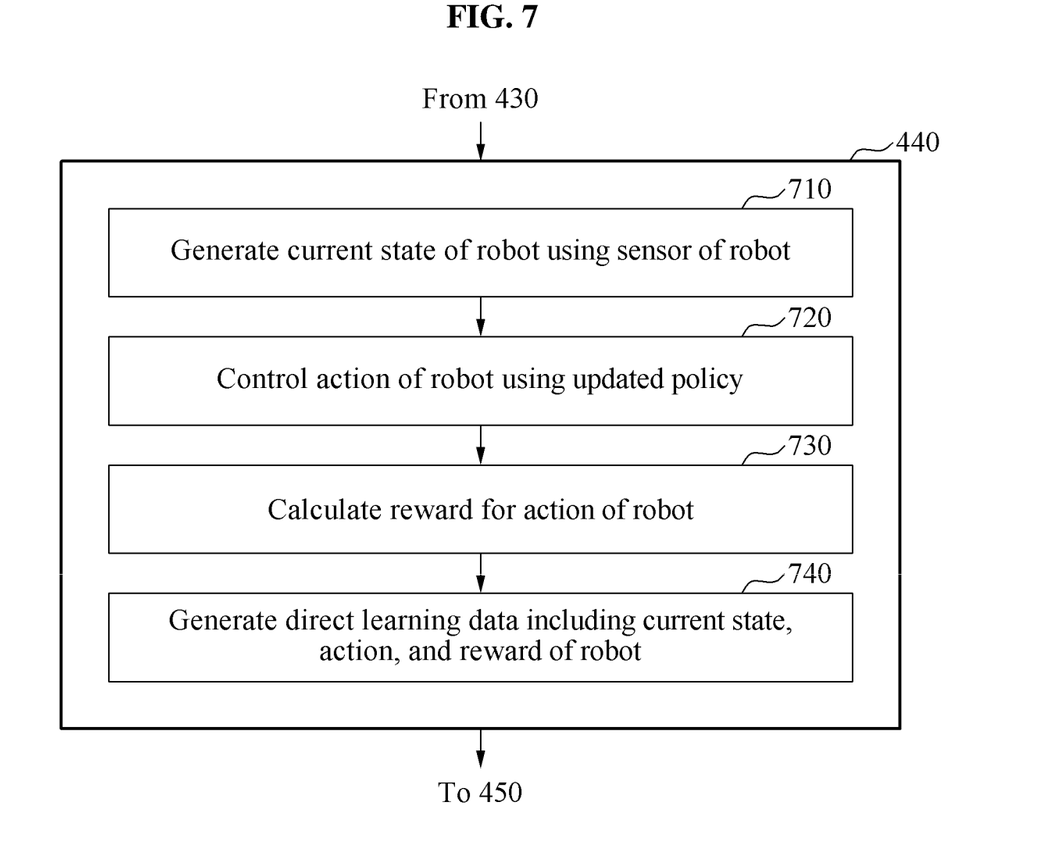
FIG. 7 is a flowchart illustrating a method of acquiring direct learning data of a robot generated based on a policy according to at least one example embodiment.

FIG. 7 is a flowchart illustrating a method of acquiring direct learning data of a robot generated based on a policy according to at least one example embodiment.

Operation 440 of FIG. 4 includes operations 710 through 740 as described below. When the electronic device 300 is included in a robot and the electronic device 300 is capable of controlling the robot, operations 710 through 740 may be performed.

In operation 710, the electronic device 300 generates a current state s of a robot using at least one sensor of the robot.

In operation 720, the electronic device 300 controls an action a of the robot using the generated current state s and a policy of the robot.

A surrounding environment of the robot may change due to the action a of the robot. Additionally, the electronic device 300 may generate a change state, for example, a next state s' using the at least one sensor of the robot.

In operation 730, the electronic device 300 calculates a reward r for the action a of the robot.

In operation 740, the electronic device 300 generates direct learning data including the current state s, the action a, and the reward r of the robot. Additionally, the direct learning data may also include the next state s'.

Figure 8:
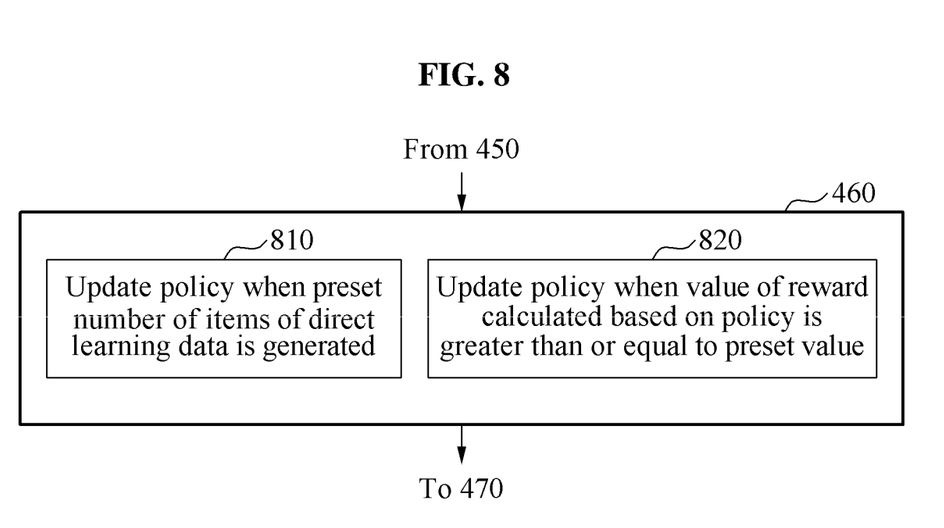
FIG. 8 is a flowchart illustrating a method of updating a policy based on a direct learning database according to at least one example embodiment.

FIG. 8 is a flowchart illustrating a method of updating a policy based on a direct learning database according to at least one example embodiment.

Operation 460 of FIG. 4 includes operations 810 and 920 as described below. Operations 810 and 820 may be selectively performed.

In operation 810, the electronic device 300 updates a policy when a desired (or, alternatively, a preset) number of items of direct learning data is generated. When a number of items of the generated direct learning data is less than the desired (or, alternatively, the preset number), the policy may not be updated, so that operation 440 is performed to acquire direct learning data.

In operation 820, the electronic device 300 updates the policy when a value of a reward r calculated based on the policy is greater than or equal to a desired (or, alternatively, a preset) value. When the value of the reward r is less than the desired (or, alternatively, the preset) value, a current action a may be determined to be inappropriate and thus, may not be applied to the policy.

FIG. 9 is a flowchart illustrating a method of updating a policy based on a direct learning database according to at least one example embodiment.

Operations 910 through 940 may be performed by the electronic device 300 described with reference to FIGS. 3 through 8.

In operation 910, the electronic device 300 receives a plurality of learning data items or a plurality of learning data sets generated by a plurality of heterogeneous agents. For example, the plurality of heterogeneous agents may include at least two of the first agent 220, the second agent 230, the third agent 240, and the fourth agent 250 described with reference to FIG. 2. Each of the first agent 220, the second agent 230, the third agent 240, and the fourth agent 250 may perform a task and generate learning data. The description of operation 910 may be replaced by the description of operation 410 of FIG. 4.

In operation 920, the electronic device 300 generates a weighted learning data based on a weight set for each of the plurality of heterogeneous agents and the plurality of learning data sets. The description of operation 920 may be replaced by the description of operation 420 of FIG. 4.

In operation 930, the electronic device 300 acquires direct learning data of a robot generated based on the weighted learning database and a policy for controlling an action of the robot. A policy used for acquiring the direct learning data may be a default policy that is not updated or trained. That is, policy used for acquiring the direct learning data may be a policy that is not pre-trained.

In operation 940, the electronic device 300 updates the policy based on the direct learning data. Since the policy is updated using the direct learning data, data acquired by the robot actually performing a tack may be applied to the policy. The direct learning data may include a current state s, an action a, and a next state s' of the robot. The electronic device 300 may update the policy such that a value of a reward r for the action a of the robot is maximized.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor-implemented method of updating a policy associated with controlling an action of a robot using an electronic device including a memory and a processor, the method comprising:
   receiving a plurality of learning datasets generated by a plurality of heterogeneous agents through performance of respective heterogeneous actions, wherein the plurality of heterogeneous agents includes at least two of a first agent corresponding to human demonstration or teaching, a second agent corresponding to a motion planner that performs motion planning, a third agent corresponding to computer simulation, and a fourth agent corresponding to a method of directly controlling the robot using a controller, wherein the plurality of learning datasets include a first learning dataset generated by a first agent of the plurality of heterogeneous agents and a second learning dataset generated by a second agent of the plurality of heterogeneous agents, wherein each of learning data item of the plurality of learning datasets includes a current state of an agent, an action of the agent in a current state, a reward for the action of the agent and a next state due to the action of the agent;
   generating, by the processor, at least one first weighted learning data item based on the first learning dataset and a first weight set of weight sets, wherein the weight sets related to the plurality of heterogeneous agents preset by a user of the electronic device indicating which of the plurality of heterogeneous agents the user prefers;
   generating, by the processor, at least one second weighted learning data item based on the second learning dataset and a second weight set of weight sets;
   generating, by the processor, the weighted learning database including the first weighted learning data item and the second weighted learning data item;
   updating, by the processor, the policy associated with controlling the action of the robot based on the weighted learning database to generate an updated policy;
   acquiring, by the processor, direct learning data of the robot generated based on the updated policy, wherein the acquiring the direct learning data of the robot based on the updated policy includes,
      generating, by the processor, a current state of the robot using at least one sensor associated with the robot,
      controlling, by the processor, the action of the robot using the updated policy,
      calculating, by the processor, a reward for the action of the robot, and
      generating, by the processor, the direct learning data including the current state of the robot, the action of the robot, and the reward for the action of the robot;
   generating, by the processor, a direct learning database including the direct learning data; and
   updating, by the processor, the policy based on the direct learning database.

2. The method of claim 1, wherein the first agent of the plurality of heterogeneous agents is configured to generate the first learning dataset of the plurality of learning datasets such that the first learning dataset includes a plurality of learning data items including a current state, the action, and a reward, the current state including information on a surrounding environment of the first agent measured by the first agent, the action being performed by the first agent for the current state, and the reward being an assessment value of the action.

3. The method of claim 1, wherein the generating of the first weighted learning data item comprises:
   calculating, by the processor, a number of data items corresponding to the first weight set for the first agent; and
   generating, by the processor, the first weighted learning data item based on the number of data items and the first learning dataset.

4. The method of claim 1, wherein the updating the policy comprises:
   updating, by the processor, the policy such that a reward value for the action of the robot increases.

5. The method of claim 1, wherein the weighted learning database includes the direct learning database such that the updating the policy based on the direct learning database comprises:
   updating, by the processor, the policy based on the weighted learning database.

6. The method of claim 1, wherein the updating the policy based on the direct learning database comprises:
   updating, by the processor, the policy in response to a set number of items of the direct learning data being generated.

7. The method of claim 1, wherein the updating the policy based on the direct learning database comprises:
   updating, by the processor, the policy in response to a reward value calculated based on the policy being greater than or equal to a set value.

8. A non-transitory computer-readable medium comprising computer readable instructions that, when executed by a computer, cause the computer to perform the method of claim 1.

9. An electronic device configured to update a policy associated with controlling an action of a robot, the electronic device comprising:
   a memory configured to store a program for updating the action of the robot; and
   a processor configured to execute the program to,
      receive a plurality of learning datasets generated by a plurality of heterogeneous agents through performance of respective heterogeneous actions, wherein the plurality of heterogeneous agents includes at least two of a first agent corresponding to human demonstration or teaching, a second agent corresponding to a motion planner that performs motion planning, a third agent corresponding to computer simulation, and a fourth agent corresponding to a method of directly controlling the robot using a controller, wherein the plurality of learning datasets include a first learning dataset generated by a first agent of the plurality of heterogeneous agents and a second learning dataset generated by a second agent of the plurality of heterogeneous agents, wherein each of learning data item of the plurality of learning datasets includes a current state of an agent, an action of the agent in a current state, a reward for the action of the agent and a next state due to the action of the agent,
      generate at least one first weighted learning data item based on the first learning dataset and a first weight set of weight sets, wherein the weight sets related to the plurality of heterogeneous agents preset by a user of the electronic device indicating which of the plurality of heterogeneous agents the user prefers,
      generate at least one second weighted learning data item based on the second learning dataset and a second weight set of weight sets,
      generate the weighted learning database including the first weighted learning data item and the second weighted learning data item,
      update the policy associated with controlling the action of the robot based on the weighted learning database to generate an updated policy,
      acquire direct learning data of the robot generated based on the updated policy, wherein the processor is configured to acquire the direct learning data of the robot based on the updated policy by,
         generating a current state of the robot using at least one sensor associated with the robot,
         controlling the action of the robot using the updated policy,
         calculating a reward for the action of the robot, and
         generating the direct learning data including the current state of the robot, the action of the robot, and the reward for the action of the robot,
      generate a direct learning database including the direct learning data, and
      update the policy based on at least the direct learning database.

10. The electronic device of claim 9, wherein the processor is configured to update the policy by,
   updating the policy in response to a set number of items of the direct learning data being generated.

11. The electronic device of claim 9, wherein the processor is configured to update the policy by,
   updating the policy in response to a reward value calculated based on the policy being greater than or equal to a set value.

12. The electronic device of claim 9, wherein the processor is configured to update the policy by,
   updating the policy such that a reward value for the action of the robot increases.

* * * * *